United States Patent
Bode

(10) Patent No.: US 10,324,849 B2
(45) Date of Patent: Jun. 18, 2019

(54) HEADLESS RESILIENT BACKUP AND RESTORE SOFTWARE ECOSYSTEM SELECTING SERVER BASED ON HISTORICAL CLIENT LATENCY, WORKLOAD AND METADATA PRESENCE IN CACHE

(71) Applicant: INTERNATIONAL BUSINESS MACHINES CORPORATION, Armonk, NY (US)

(72) Inventor: Christopher C. Bode, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 136 days.

(21) Appl. No.: 15/431,105

(22) Filed: Feb. 13, 2017

(65) Prior Publication Data
US 2018/0232162 A1  Aug. 16, 2018

(51) Int. Cl.
*G06F 12/0862* (2016.01)
*H04L 29/08* (2006.01)

(52) U.S. Cl.
CPC ...... *G06F 12/0862* (2013.01); *H04L 67/1008* (2013.01); *H04L 67/1095* (2013.01); *H04L 67/1097* (2013.01); *G06F 2212/602* (2013.01)

(58) Field of Classification Search
CPC combination set(s) only.
See application file for complete search history.

(56) References Cited

U.S. PATENT DOCUMENTS

| | | |
|---|---|---|
| 6,185,598 B1 * | 2/2001 | Farber ............... G06F 9/505 709/200 |
| 8,140,791 B1 | 3/2012 | Greene |
| 8,762,349 B2 | 6/2014 | Jayaraman et al. |
| 9,372,854 B2 | 6/2016 | Gold et al. |

(Continued)

FOREIGN PATENT DOCUMENTS

| | | |
|---|---|---|
| CN | 1633086 A | 6/2005 |
| WO | 2007120437 A | 10/2007 |

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

(Continued)

*Primary Examiner* — Rocio Del Mar Perez-Velez
*Assistant Examiner* — Chie Yew
(74) *Attorney, Agent, or Firm* — Janaki K. Davda; Konrad Raynes Davda & Victor LLP

(57) ABSTRACT

Provided are techniques for a headless resilient backup and restore software ecosystem. At a first backup server of a plurality of backup servers, a connection request is received. At the first backup server, a second backup server is identified by: determining a backup server score for each of the plurality of backup servers based on identification factors comprising historical client latency, scheduled backup server workload, and whether the metadata is already cached on any of the plurality of backup servers and identifying the second backup server as having a lowest backup server score. The identification of the second backup server is returned.

18 Claims, 9 Drawing Sheets

(56) References Cited

U.S. PATENT DOCUMENTS

| | | | | |
|---|---|---|---|---|
| 10,055,262 B1* | 8/2018 | Thomas | ................ | G06F 9/5083 |
| 2006/0161577 A1* | 7/2006 | Kulkarni | ............. | H04L 67/1008 |
| 2006/0209682 A1* | 9/2006 | Filsfils | .................... | H04L 45/04 |
| | | | | 370/219 |
| 2010/0274983 A1 | 10/2010 | Murphy et al. | | |
| 2011/0167165 A1* | 7/2011 | Bryan | ..................... | G06F 9/541 |
| | | | | 709/230 |
| 2013/0031403 A1* | 1/2013 | Mordani | ................ | H04L 67/28 |
| | | | | 714/4.11 |

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

"Swift Architectural Overview", [online][retrieved Jan. 13, 2017] http://docs.openstack.org/developer/swift/overview_architecture.html, Total 3 pp.

English translation of Chinese Patent CN1633086, Jun. 29, 2005, Total 9 pp.

* cited by examiner

… (1)

HEADLESS RESILIENT BACKUP AND RESTORE SOFTWARE ECOSYSTEM SELECTING SERVER BASED ON HISTORICAL CLIENT LATENCY, WORKLOAD AND METADATA PRESENCE IN CACHE

FIELD

Embodiments of the invention relate to a headless resilient backup and restore software ecosystem.

BACKGROUND

A backup environment includes clients accessing server computers for data. The same data may be stored in different server computers. However, existing backup infrastructure designs use flawed and limited approaches to scaling the backup environment.

One conventional approach relies on shifting to larger hardware in a "scale up" technique, which does not translate well into modern commodity based computing environments, such as those used by public cloud providers.

For those environments that do scale out, another conventional approach relies on a head server computer that centrally handles the scheduling and distribution of work among the server computers (e.g., requests from the clients), but, if the head server computer becomes unavailable, the entire backup environment becomes unusable.

SUMMARY

Provided is a computer program product for a headless resilient backup and restore software ecosystem. The computer program product comprises a computer readable storage medium having program code embodied therewith, the program code executable by at least one processor to perform: receiving, at a first backup server of a plurality of backup servers, a connection request; identifying, at the first backup server, a second backup server by: determining a backup server score for each of the plurality of backup servers based on identification factors comprising historical client latency, scheduled backup server workload, and whether metadata is already cached on any of the plurality of backup servers, and identifying the second backup server as having a lowest backup server score; and returning identification of the second backup server.

Provided is a computer system for a headless resilient backup and restore software ecosystem. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving, at a first backup server of a plurality of backup servers, a connection request; identifying, at the first backup server, a second backup server by: determining a backup server score for each of the plurality of backup servers based on identification factors comprising historical client latency, scheduled backup server workload, and whether metadata is already cached on any of the plurality of backup servers, and identifying the second backup server as having a lowest backup server score; and returning identification of the second backup server.

Provided is a method for a headless resilient backup and restore software ecosystem. The method comprises: receiving, at a first backup server of a plurality of backup servers, a connection request; identifying, at the first backup server, a second backup server by: determining a backup server score for each of the plurality of backup servers based on identification factors comprising historical client latency, scheduled backup server workload, and whether metadata is already cached on any of the plurality of backup servers, and identifying the second backup server as having a lowest backup server score; and returning identification of the second backup server.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With embodiments, a backup and restore software ecosystem includes the following components: backup servers, metadata caches, metadata repositories, and common storage. With embodiments, the backup and restore software ecosystem optionally includes backup data storage, which may be cache. The common storage stores the authoritative copy of backup data (i.e., objects), while the backup data storage caches temporary copies of the backup data for performance improvement. The metadata repositories and the metadata cache store metadata. The backup servers respond to requests from clients regarding objects (e.g., moving objects, storing new objects, deleting existing objects, backing up new objects, retrieving/restoring objects, etc.). Each of the backup servers has its own metadata cache and optionally its own backup data storage.

Thus, the backup and restore software ecosystem encompasses both metadata storage and backup data storage comprised of multiple compute and storage resources. The backup and restore software ecosystem is able to function without relying on any one central component (i.e., it is "headless"). The backup and restore software ecosystem also grows and shrinks based on demand by adding or removing components of a given type without having to bring down the entire backup and restore software ecosystem. The backup and restore software ecosystem also allows every component to actively contribute to the load being handled by the backup and restore software ecosystem, and there are no passive components required for redundancy.

Figure 1:
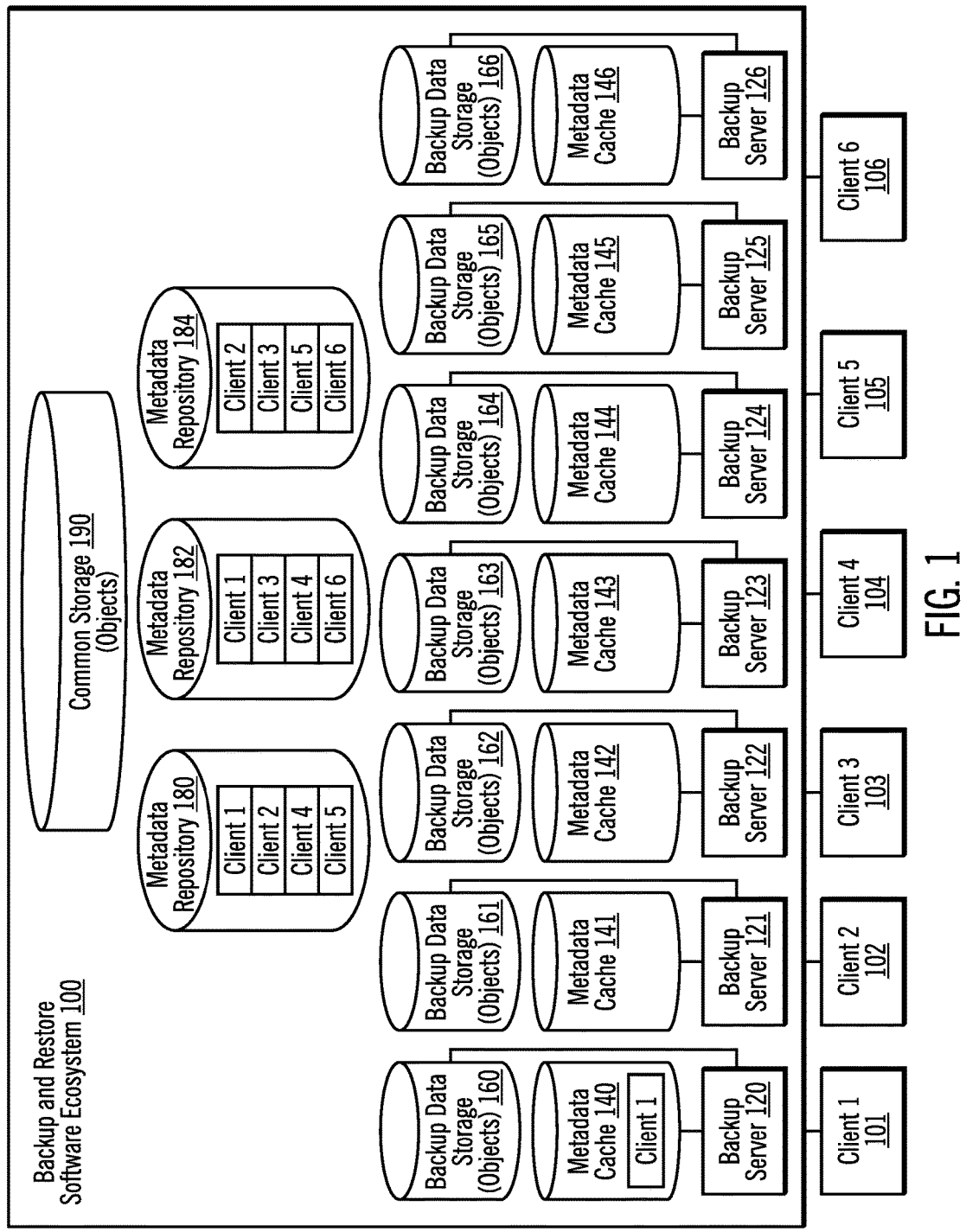
FIG. 1 illustrates, in a block diagram, a backup and restore software ecosystem in accordance with certain embodiments.

FIG. 1 illustrates, in a block diagram, a backup and restore software ecosystem 100 in accordance with certain embodiments. Clients 101, 102, 103, 104, 105, 106 are coupled to the backup and restore software ecosystem 100.

The backup and restore software ecosystem 100 includes:
backup servers 120, 121, 122, 123, 124, 125, 126;
metadata cache 140, 141, 142, 143, 144, 145, 146;
backup data storage 160, 161, 162, 163, 164, 165, 166;
metadata repositories 180, 182, 184; and
common storage 190.

In FIG. 1, backup server 120 is coupled to metadata cache 140 and backup data storage 160; backup server 121 is coupled to metadata cache 141 and backup data storage 161; backup server 122 is coupled to metadata cache 142 and backup data storage 162; backup server 123 is coupled to metadata cache 143 and backup data storage 163; backup server 124 is coupled to metadata cache 144 and backup data storage 164; backup server 125 is coupled to metadata cache 145 and backup data storage 165; and backup server 126 is coupled to metadata cache 146 and backup data storage 166. Each of the backup servers 120, 121, 122, 123, 124, 125, 126 may store objects in common storage 190 and may store metadata in metadata repositories 180, 182, 184. Also, each of the backup servers 120, 121, 122, 123, 124, 125, 126 knows which jobs are being executed on which backup servers 120, 121, 122, 123, 124, 125, 126. Metadata cache 140 includes pre-fetched metadata for client 1.

Clients 101, 102, 103, 104, 105, 106 may issue request about the objects to any of the backup servers 120, 121, 122, 123, 124, 125, 126.

With embodiments, metadata for a given client 101, 102, 103, 104, 105, 106 may be placed on at least two separate metadata repositories 180, 182, 184. For example, metadata for client 1 101 is stored on metadata repositories 180, 182; metadata for client 2 102 is stored on metadata repositories 180, 184; metadata for client 3 103 is stored on metadata repositories 182, 184; metadata for client 4 104 is stored on metadata repositories 180, 182; metadata for client 5 105 is stored on metadata repositories 180, 184; metadata for client 6 106 is stored on metadata repositories 182, 184.

The number of metadata repositories 180, 182, 184 to store the metadata for a given client 101, 102, 103, 104, 105, 106 is determined by the amount of redundancy desired. With embodiments, a system administrator may set this number.

Figure 2:
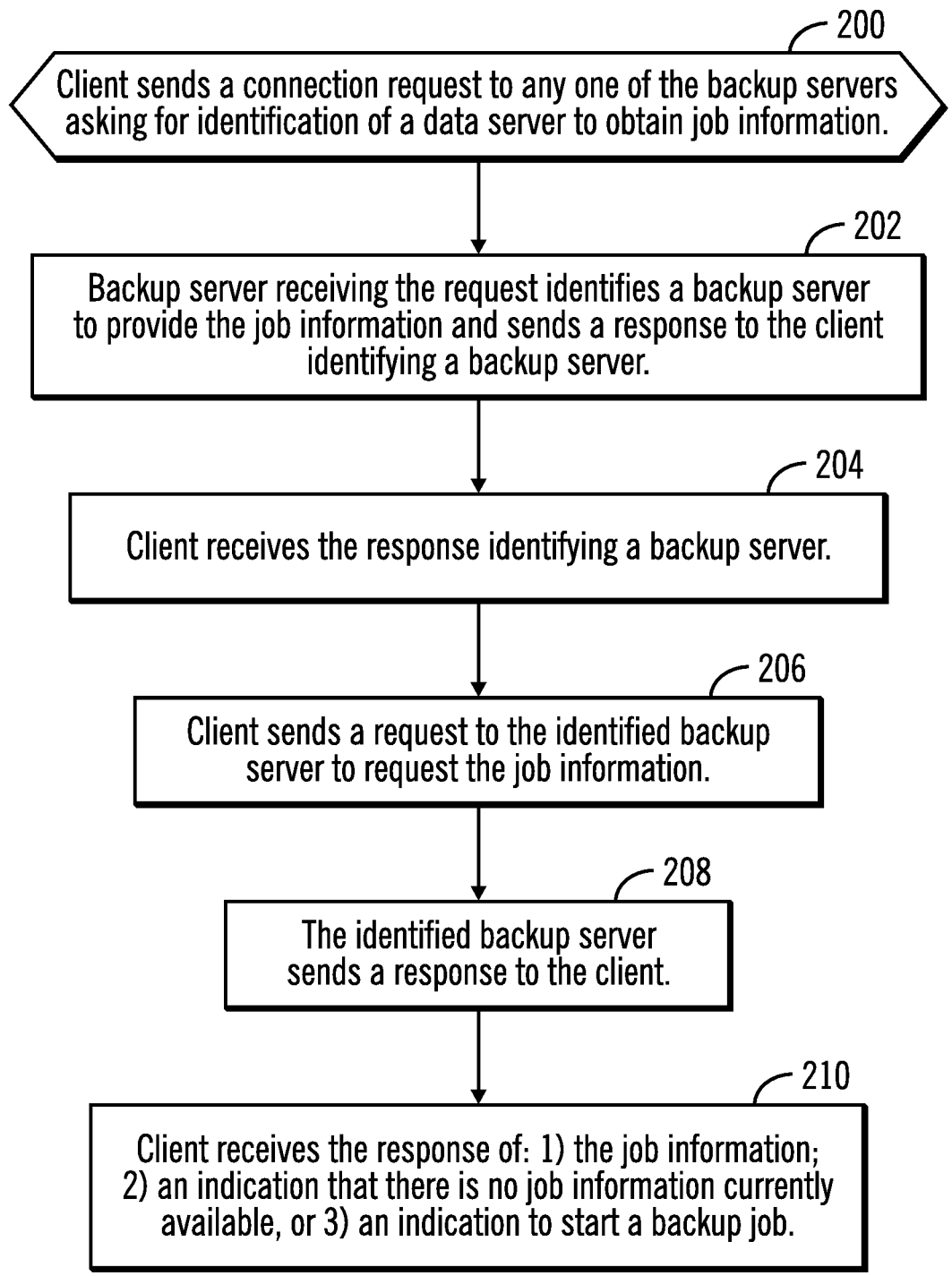
FIG. 2 illustrates, in a flow chart, operations for a client to check for job information in accordance with certain embodiments.

A client may periodically check with the backup and restore software ecosystem 100 for outstanding jobs. FIG. 2 illustrates, in a flow chart, operations for a client to check for job information in accordance with certain embodiments. Control begins at block 200 with the client sending a connection request to any one of the backup servers asking for identification of a data server to obtain job information.

In block 202, the backup server receiving the request identifies a backup server to provide the job information and sends a response to the client identifying a backup server. In block 204, the client receives the response identifying a backup server. That is, any backup server that receives the request from the client is able to identify a backup server to respond to the client request. This allows for load balancing among the backup servers in a "headless" backup and restore software ecosystem 100 (i.e., unlike conventional systems, there is no need for one of the backup servers to be the "head" in charge of load balancing).

Figure 3:
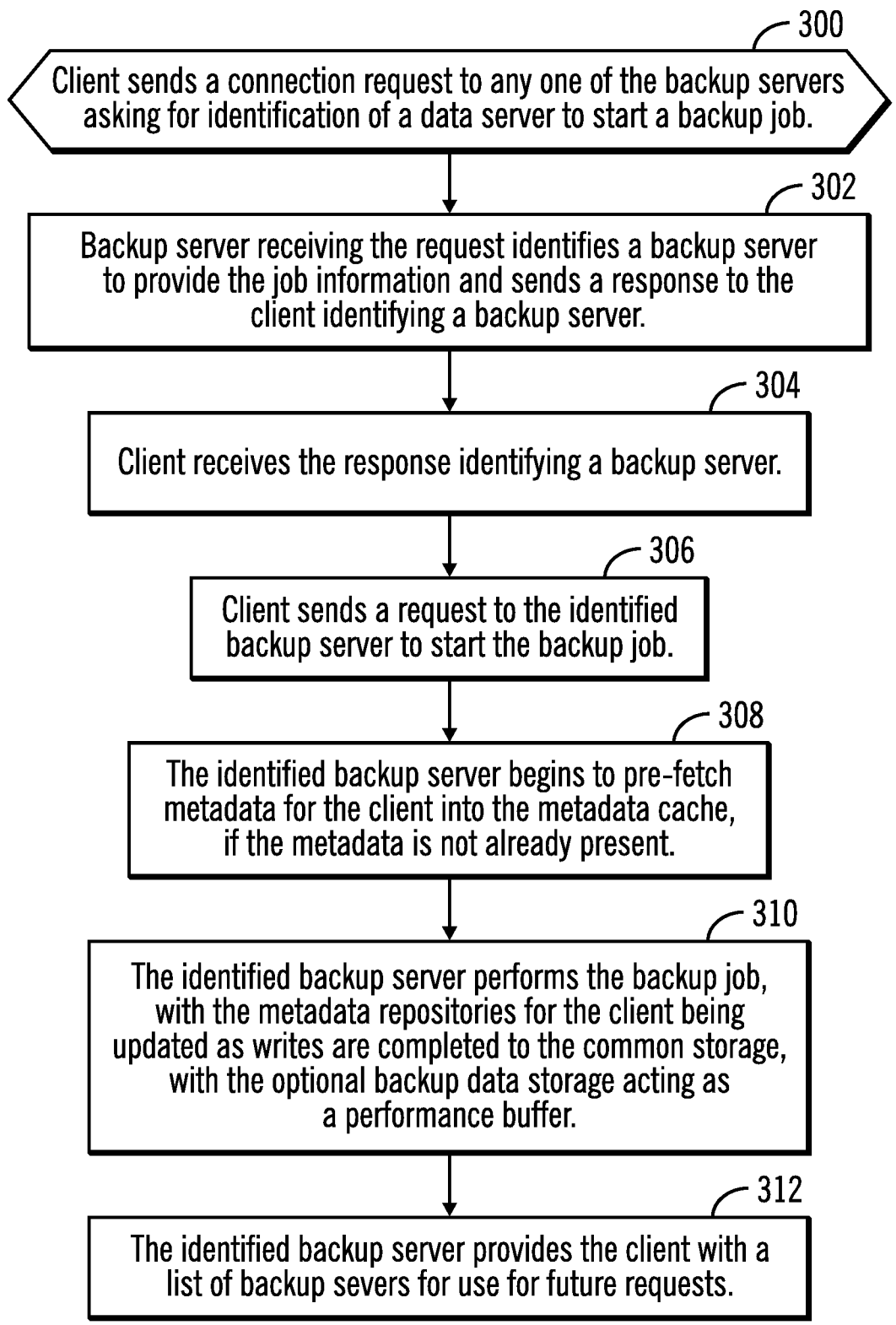
FIG. 3 illustrates, in a flow chart, operations for a client to attempt a backup operation in accordance with certain embodiments.

In block 206, the client sends a request to the identified backup server to request the job information. In block 208, the identified backup server sends a response to the client. In block 210, the client receives a response of: 1) the job information; 2) an indication that there is no job information currently available (and to check back later), or 3) an indication to start a backup job. FIG. 3 illustrates, in a flow chart, operations for a client to attempt a backup operation (i.e., to backup objects from the client to the backup server, for storage in the common store) in accordance with certain embodiments. Control begins at block 300 with the client sending a connection request to any one of the backup servers asking for identification of a data server to start a backup job.

In block 302, the backup server receiving the request identifies a backup server to provide the job information and sends a response to the client identifying a backup server. In block 304, the client receives the response identifying a backup server. That is, any backup server that receives the request from the client is able to identify a backup server to respond to the client request. This allows for load balancing among the backup servers in a "headless" backup and restore software ecosystem 100.

In block 306, the client sends a request to the identified backup server to start the backup job. In block 308, the identified backup server begins to pre-fetch metadata for the client into the metadata cache (for that backup server), if the metadata is not already present. In block 310, the identified backup server performs the backup job, with the metadata repositories for the client being updated as writes are completed to the common storage, with the optional backup data storage acting as a performance buffer. That is, the objects from the client being backed up may be temporarily stored in the backup data storage, before being stored in the common storage. In block 312, the identified backup server provides the client with a list of backup severs for use for future (subsequent) requests. With embodiments, this is an updated list of all backup servers for future connection attempts. For example, if a backup server is no longer available or a new backup server is available, the updated list will reflect this.

Figure 4:
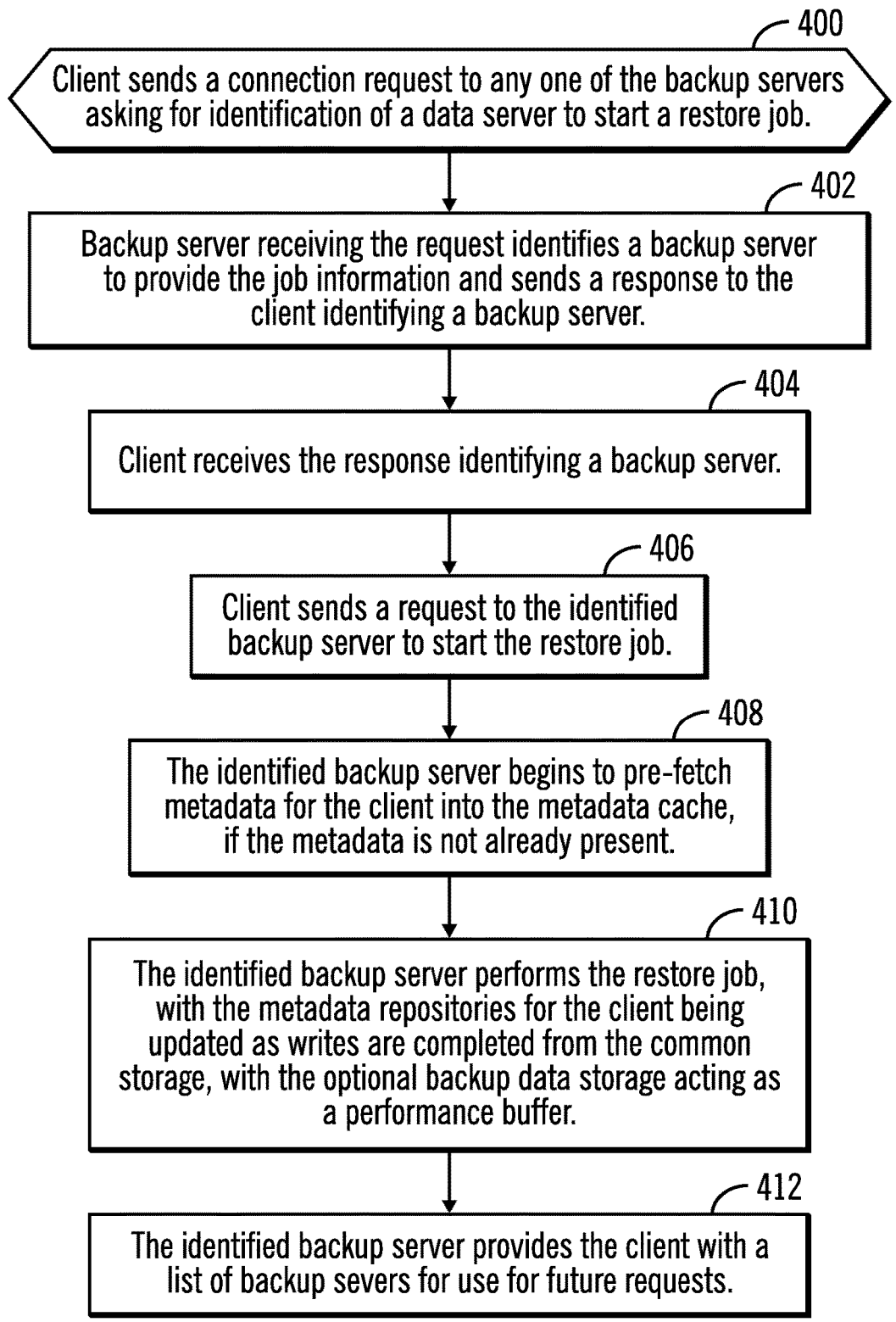
FIG. 4 illustrates, in a flow chart, operations for a client to attempt a restore operation in accordance with certain embodiments.

FIG. 4 illustrates, in a flow chart, operations for a client to attempt a restore operation (i.e., to restore objects from the backup server (i.e., from the common store) to the client) in accordance with certain embodiments. Control begins at block 400 with the client sending a connection request to any one of the backup servers asking for identification of a data server to start a restore job. In block 402, the backup server receiving the request identifies a backup server to provide the job information and sends a response to the client identifying a backup server. In block 404, the client receives the response identifying a backup server. That is, any backup server that receives the request from the client is able to identify a backup server to respond to the client request. This allows for load balancing among the backup servers in a "headless" backup and restore software ecosystem 100.

In block 406, the client sends a request to the identified backup server to start the restore job. In block 408, the identified backup server begins to pre-fetch metadata for the client into the metadata cache (for that backup server), if the metadata is not already present. In block 410, the identified backup server performs the restore job, with the metadata repositories for the client being updated as writes are completed from the common storage, with the optional backup data storage acting as a performance buffer. That is, the objects from the common store being restored may be temporarily stored in the backup data storage, before being returned to the client. Embodiments may pre-fetch to the backup data storage to improve performance. In block 412, the identified backup server provides the client with a list of backup severs for use for future requests. With embodiments, this is an updated list of all backup servers for future connection attempts. For example, if a backup server is no longer available or a new backup server is available, the updated list will reflect this.

Figure 5:
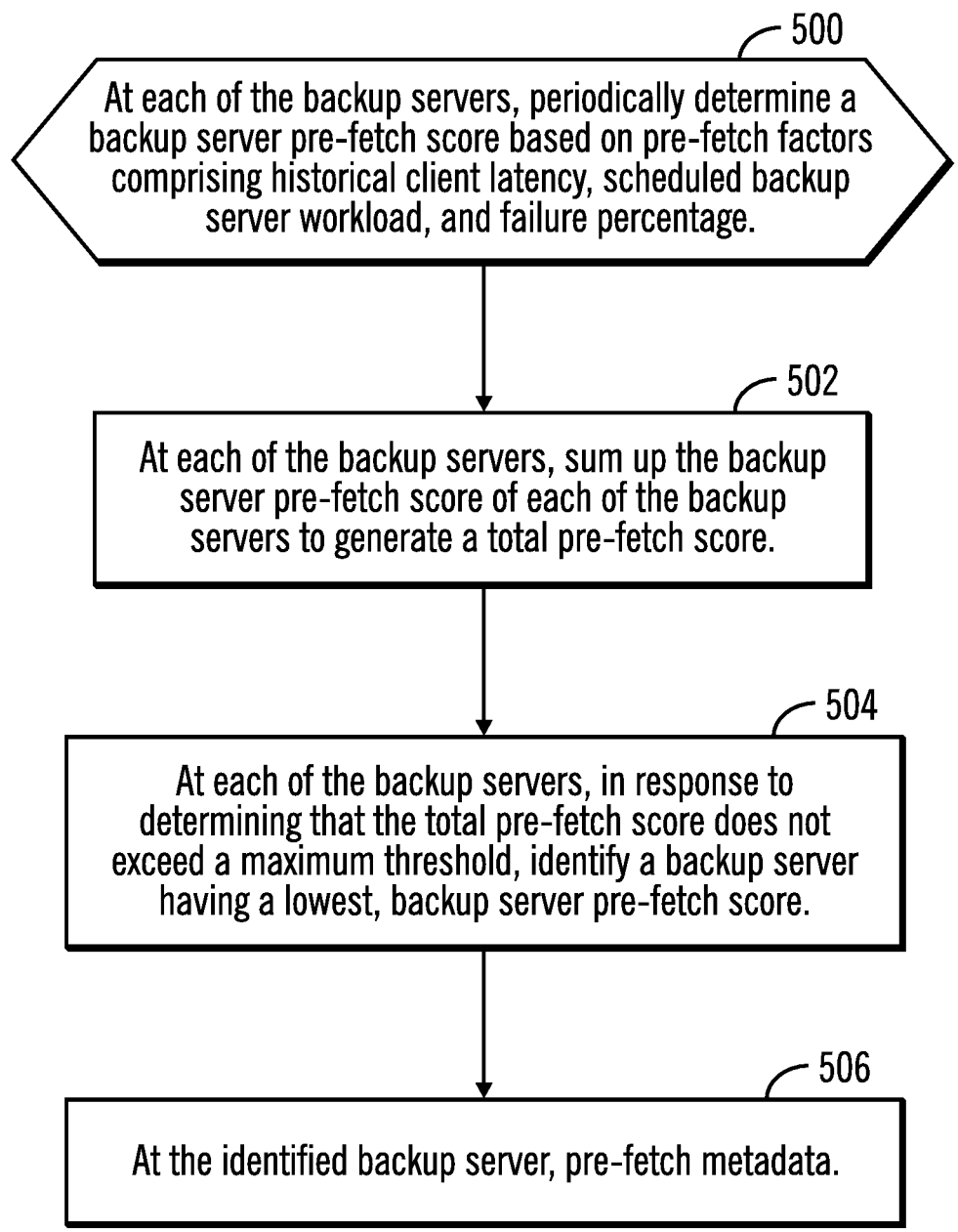
FIG. 5 illustrates, in a flow chart, operations for pre-fetching metadata in accordance with certain embodiments.

FIG. 5 illustrates, in a flow chart, operations for pre-fetching metadata in accordance with certain embodiments. With embodiments, each backup server performs the operations of FIG. 5. Control begins at block 500, with each of the backup servers periodically determining a backup server pre-fetch score. In block 502, at each of the backup servers, the backup server pre-fetch score of each of the backup servers is summed up to generate a total pre-fetch score. In block 504, at each of the backup servers, in response to determining that the total pre-fetch score does not exceed a maximum threshold, a backup server having a lowest, backup server pre-fetch score is identified. In block 506, the identified backup server pre-fetches metadata. With embodiments, the maximum threshold may be adjusted by a system administrator. That is, if the total pre-fetch score exceeds a maximum threshold, metadata is not pre-fetched, otherwise, metadata is pre-fetched on the backup server having the lowest, backup server pre-fetch score.

With embodiments, each backup server determines a client pre-fetch score for each client and then sums up those client pre-fetch scores to determine the total pre-fetch score. With embodiments each of the backup servers periodically evaluates, for each client that interacts with that backup server, a list of upcoming scheduled jobs and uses historical client latency, scheduled backup server workloads of that backup server, and past reliability of the client to determine the pre-fetch score. Thus, the pre-fetch score for a client is based on pre-fetch factors comprising historical client latency, scheduled backup server workloads, and failure percentage.

With embodiments, each backup server uses the following formulas:

client pre-fetch score=(historical client latency*weight1)+(scheduled backup server workload*weight2)+((1−failure percentage)*weight3)

backup server pre-fetch score=sum of client pre-fetch scores total pre-fetch score=sum of backup server prefetch scores Historical client latency may be described as a measured round trip time of the client for the past several times that the client has interacted with the backup server. The scheduled backup server workload may be described as the scheduled backup server workload of the backup server generating the pre-fetch score. The scheduled backup server workload may also be referred to as a current backup server workload. The failure percentage may be described as a measure of the reliability of the client (i.e., the backup server does not want to pre-fetch for a client that hasn't talked to the backup server for a period of time (e.g., during several past scheduled windows of time)). With embodiments, weights may be used to adjust the pre-fetch factors in the formula. With embodiments, any group of weight1, weight2, and weight3 may have the same value or different values. Also, the weights may be adjusted by a system administrator.

Figure 6:
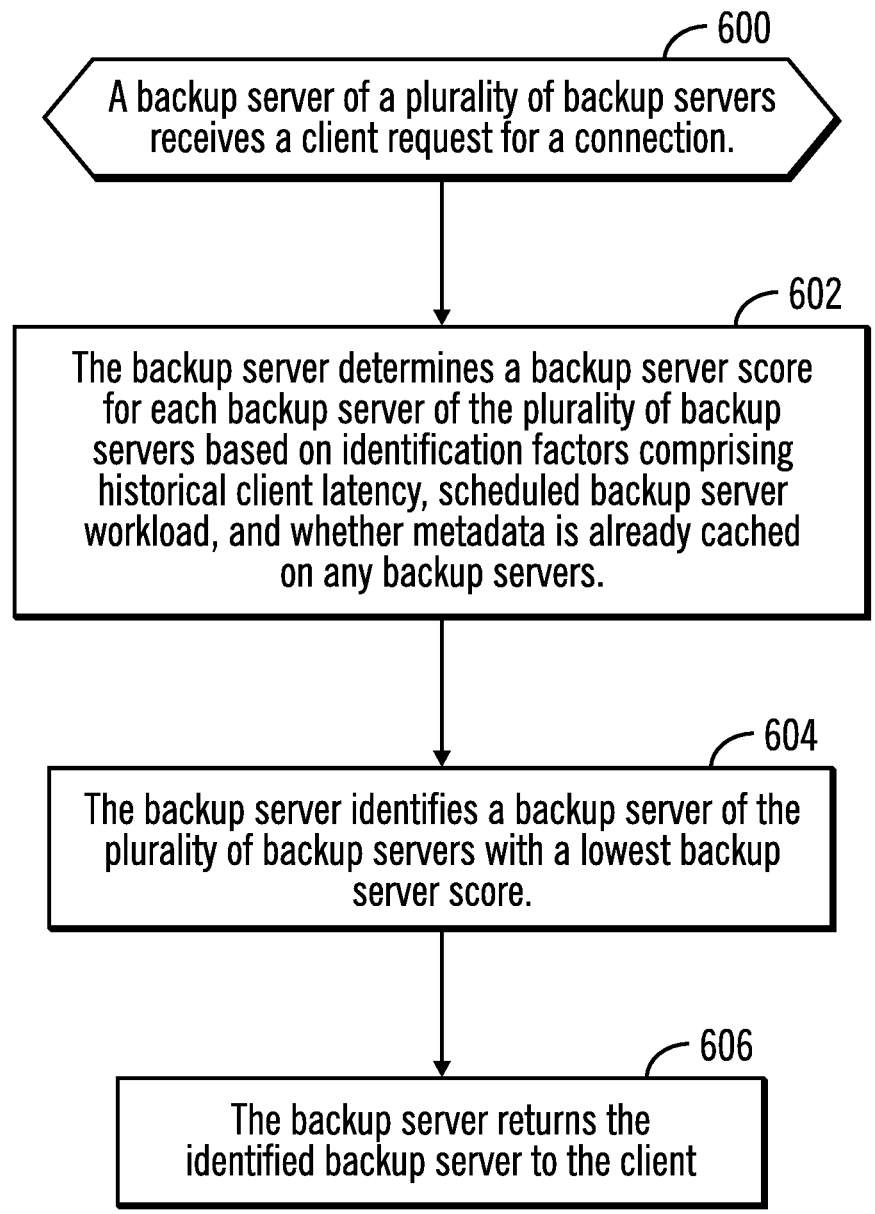
FIG. 6 illustrates, in a flow chart, operations for identifying a backup server in accordance with certain embodiments.

FIG. 6 illustrates, in a flow chart, operations for identifying a backup server in accordance with certain embodiments. Control begins at block 600 with a backup server of a plurality of backup servers receiving a client request for a connection. In block 602, the backup server determines a backup server score for each backup server of the plurality of backup servers based on identification factors comprising historical client latency, scheduled backup server workload, and whether the metadata is already cached on any backup servers. In block 604, the backup server identifies a backup server of the plurality of backup servers with a lowest backup server score. In block 606, the backup server returns the identified backup server to the client.

With embodiments, the backup server is identified based on several weighted identification factors x, y, and z as follows:

x=historical client latency of each client of the backup server (where x may be determined by summing up the historical client latency of each client that accesses the backup server);

y=scheduled backup server workload; and z=whether metadata for any client is already cached for the backup server (i.e., pre-fetched for scheduled jobs).

With embodiments, each of the identification factors x, y, and z is evaluated individually to generate a score that is adjusted by a weight. With embodiments, each identification factor has a weight associated with it (a, b, and c) such that the total score "S" for a given backup server is:

$$S=xa+yb+zc$$

The scores for each backup server are compared to identify the backup server with the lowest score, which is selected to process a job for the client.

With embodiments, any group of weight a, weight b, and weight c may have the same value or different values. Also, the weights may be adjusted by a system administrator.

With embodiments, if one of the backup servers becomes unavailable, then any of the other backup servers is able to determine that a backup server is unavailable and execute the jobs that the backup server had been executing. With embodiments, the backup servers share their scheduling information with each other to enable one backup server to take over jobs for another backup server.

Thus, embodiments provide a backup and restore software ecosystem 100 for managing and performing data backup and restore operations. Embodiments dynamically manages a set of backup servers to activate and de-activate backup servers as needed. In cloud environments, it is possible to spin up and spin down additional servers in under a few (e.g., 5) minutes. Using this capability, embodiments may quickly adjust the number of backup servers to match peak loads, while de-activating backup servers during low demand to minimize costs. Embodiments also assign a specific backup server to a client request based on identification factors representing backup and restore software ecosystem 100 performance.

Embodiments avoid having a central scheduler/balancer, which represents a single point of failure, by providing a headless backup and restore software ecosystem 100 in which each of the backup servers performs load balancing. Also, the client may request a connection from any of the backup servers, which avoids the client having to always work with a particular backup server.

With embodiments, the backup servers may be dynamically created and removed based on load requirements.

Embodiments enable managing and performing data backup operations by assigning a specific backup server to a client request based on certain system performance factors and determining pre-fetch of metadata by evaluating a list of upcoming jobs/data and historical client latency.

Figure 7:
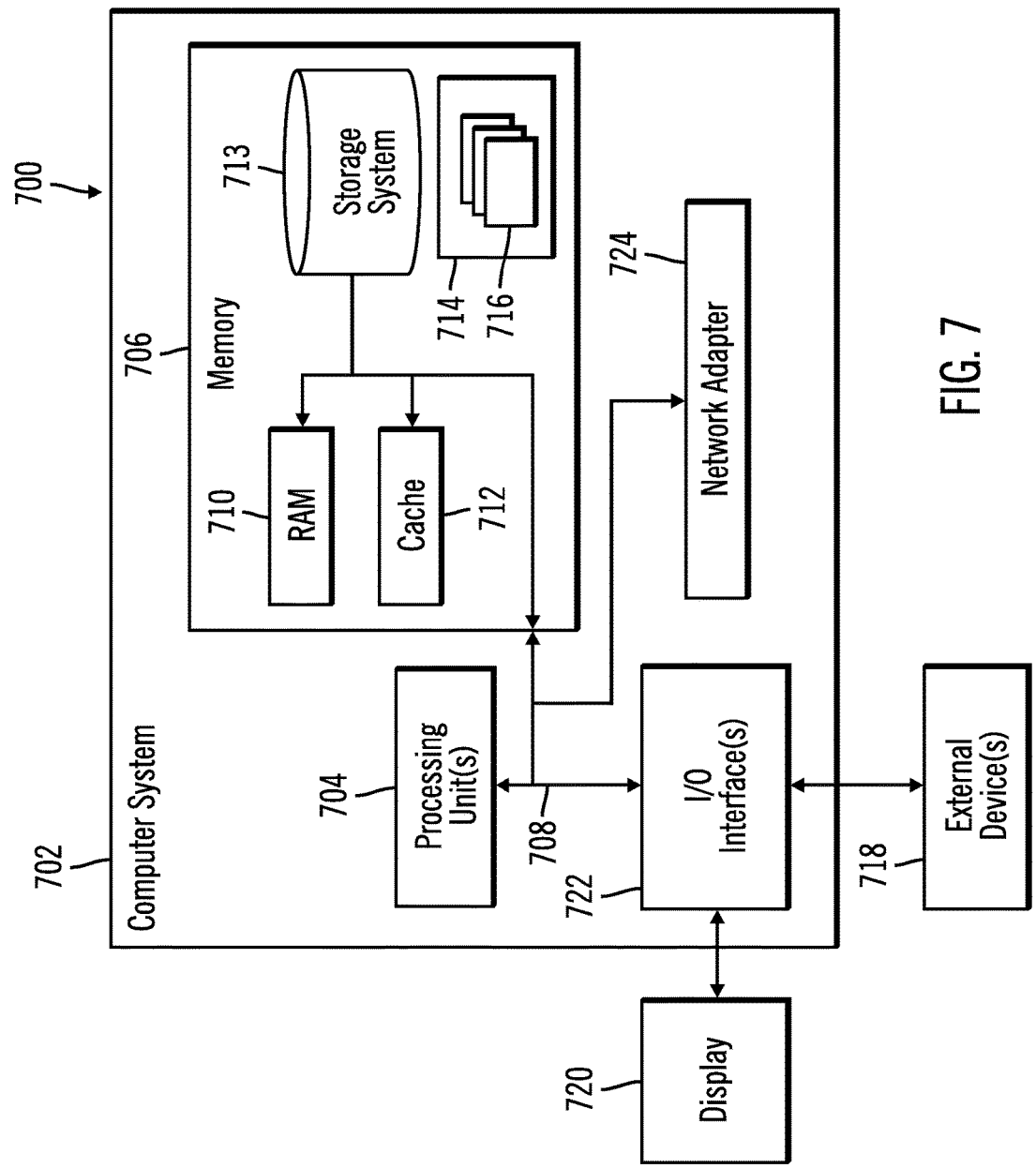
FIG. 7 illustrates a computing architecture in which the components of FIG. 1 may be implemented.

FIG. 7 illustrates a computing architecture in which the components of FIG. 1 may be implemented. In certain embodiments, the storage controller 70 and/or hosts 190 may implement computer architecture 700.

Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 711 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
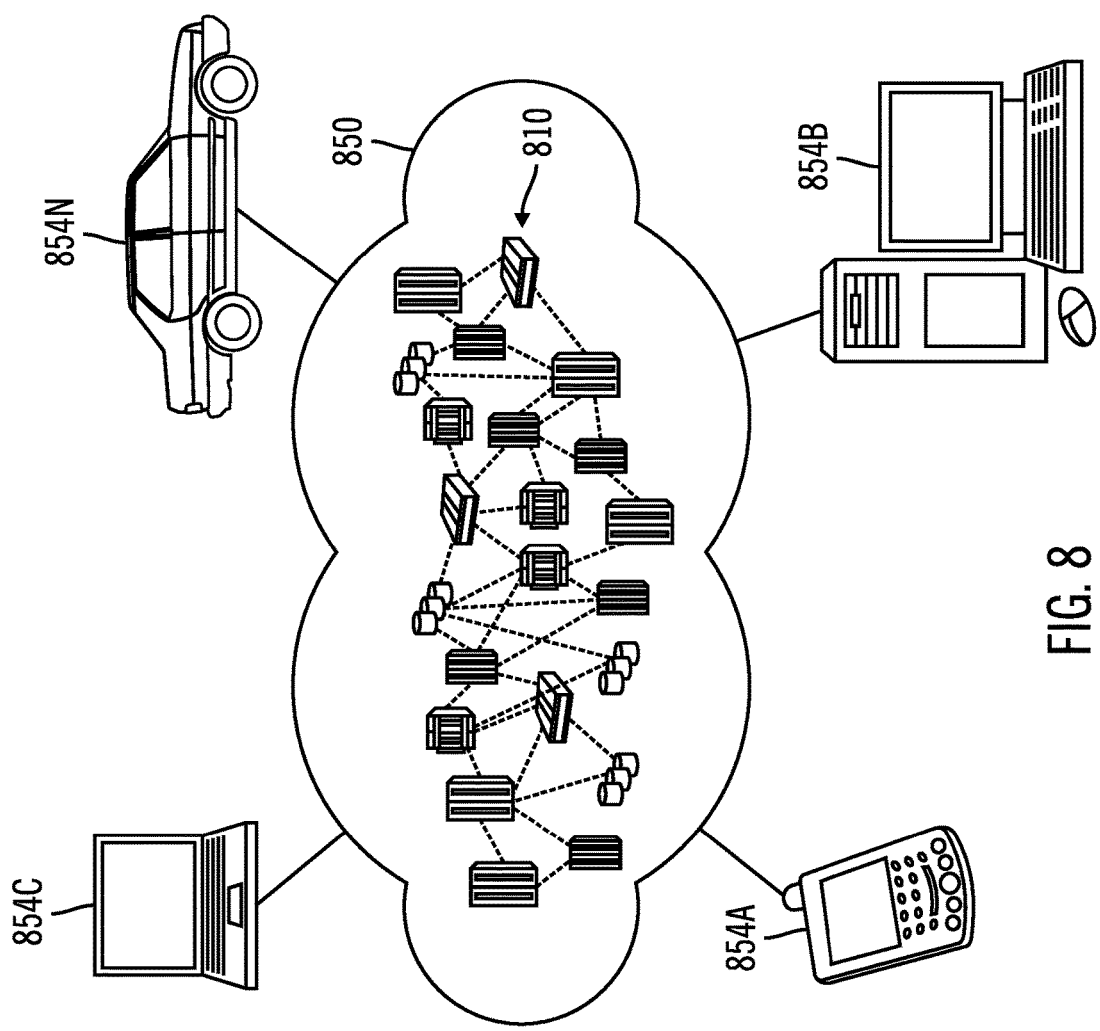
FIG. 8 illustrates a cloud computing environment according to an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
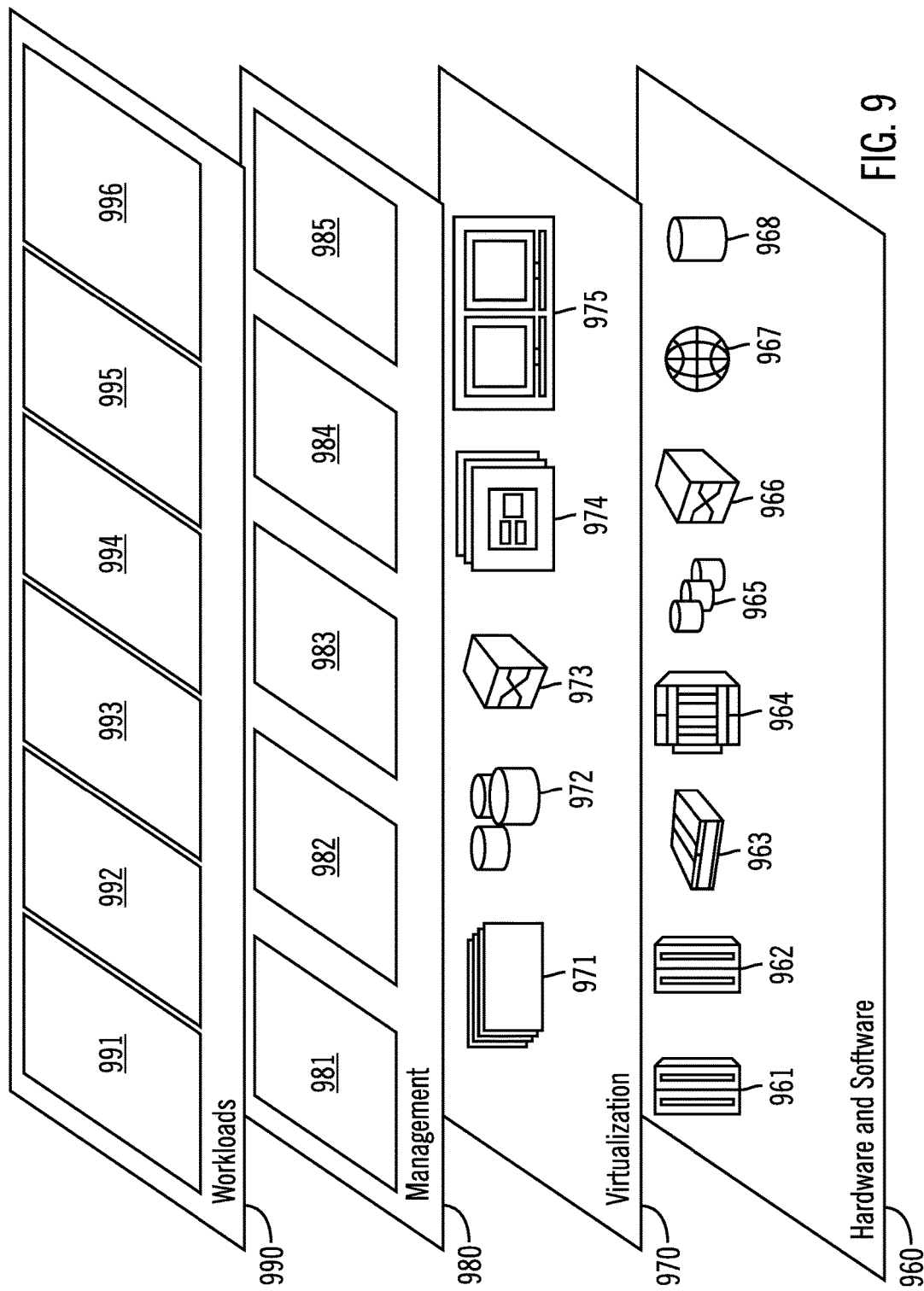
FIG. 9 illustrates abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and headless resilient backup and restore software ecosystem.

Thus, in certain embodiments, software or a program, implementing headless resilient backup and restore software ecosystem in accordance with embodiments described herein, is provided as a service in a cloud infrastructure.

In certain embodiments, the components of the backup and restore software ecosystem 100 are part of a cloud infrastructure. In other embodiments, the components of the backup and restore software ecosystem 100 are not part of a cloud infrastructure.

Thus, in certain embodiments, a plurality of backup servers are nodes in a cloud infrastructure that includes metadata cache for each of the plurality of backup servers, backup data storage for each of the plurality of backup servers, metadata repositories shared by each of the plurality of backup servers, and common storage shared by each of the plurality of backup servers.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
    performing load balancing at each of a plurality of backup servers in a headless backup and restore software ecosystem without one of the backup servers being in charge of the load balancing by:
        receiving, at a first backup server of the plurality of backup servers, a connection request;
        identifying, at the first backup server, a second backup server of the plurality of backup servers by:
            determining a backup server score for each of the plurality of backup servers based on a weighted sum of identification factors comprising historical client latency, scheduled backup server workload, and whether metadata is already cached on any of the plurality of backup servers; and
            identifying the second backup server as having a lowest backup server score among the backup server score for each of the plurality of backup servers; and
        in response to the connection request, returning identification of the second backup server.

2. The computer program product of claim 1, wherein the identification factors have associated weights that are used to determine the weighted sum of the identification factors.

3. The computer program product of claim 1, wherein the program code is executable by at least one processor to perform:
    at each of the plurality of backup servers, periodically determining a total pre-fetch score by summing a pre-fetch score of each of the plurality of backup servers, wherein the pre-fetch score of each of the plurality of backup servers comprises the historical client latency, the scheduled backup server workload, and a failure percentage; and
    in response to determining that the total pre-fetch score does not exceed a maximum threshold, pre-fetching metadata on a backup server of the plurality of backup servers having a lowest pre-fetch score from the pre-fetch score of each of the plurality of backup servers.

4. The computer program product of claim 1, wherein the metadata is pre-fetched from a metadata repository to metadata cache.

5. The computer program product of claim 1, wherein the second backup server provides a client with a list of backup severs for use for future requests.

6. The computer program product of claim 1, wherein the plurality of backup servers are nodes in a cloud infrastructure that includes a metadata cache for each of the plurality of backup servers, backup data storage for each of the plurality of backup servers, metadata repositories shared by each of the plurality of backup servers, and common storage shared by each of the plurality of backup servers.

7. A computer system, comprising:
    one or more processors, one or more memories and one or more computer readable storage media; and
    program instructions, stored on at least one of the one or more computer readable storage media for execution by at least one of the one or more processors via at least one of the one or more memories, to perform operations comprising:

performing load balancing at each of a plurality of backup servers in a headless backup and restore software ecosystem without one of the backup servers being in charge of the load balancing by:
- receiving, at a first backup server of the plurality of backup servers, a connection request;
- identifying, at the first backup server, a second backup server of the plurality of backup servers by:
  - determining a backup server score for each of the plurality of backup servers based on a weighted sum of identification factors comprising historical client latency, scheduled backup server workload, and whether metadata is already cached on any of the plurality of backup servers; and
  - identifying the second backup server as having a lowest backup server score among the backup server score for each of the plurality of backup servers; and
- in response to the connection request, returning identification of the second backup server.

8. The computer system of claim 7, wherein the identification factors have associated weights that are used to determine the weighted sum of the identification factors.

9. The computer system of claim 7, wherein the operations further comprise:
- at each of the plurality of backup servers, periodically determining a total pre-fetch score by summing a pre-fetch score of each of the plurality of backup servers, wherein the pre-fetch score of each of the plurality of backup servers comprises the historical client latency, the scheduled backup server workload, and a failure percentage; and
- in response to determining that the total pre-fetch score does not exceed a maximum threshold, pre-fetching metadata on a backup server of the plurality of backup servers having a lowest pre-fetch score from the pre-fetch score of each of the plurality of backup servers.

10. The computer system of claim 7, wherein the metadata is pre-fetched from a metadata repository to metadata cache.

11. The computer system of claim 7, wherein the second backup server provides a client with a list of backup severs for use for future requests.

12. The computer system of claim 7, wherein the plurality of backup servers are nodes in a cloud infrastructure that includes a metadata cache for each of the plurality of backup servers, backup data storage for each of the plurality of backup servers, metadata repositories shared by each of the plurality of backup servers, and common storage shared by each of the plurality of backup servers.

13. A computer-implemented method, comprising:
performing load balancing at each of a plurality of backup servers in a headless backup and restore software ecosystem without one of the backup servers being in charge of the load balancing by:
- receiving, at a first backup server of the plurality of backup servers, a connection request;
- identifying, at the first backup server, a second backup server of the plurality of backup servers by:
  - determining a backup server score for each of the plurality of backup servers based on a weighted sum of identification factors comprising historical client latency, scheduled backup server workload, and whether metadata is already cached on any of the plurality of backup servers; and
  - identifying the second backup server as having a lowest backup server score among the backup server score for each of the plurality of backup servers; and
- in response to the connection request, returning identification of the second backup server.

14. The computer-implemented method of claim 13, wherein the identification factors have associated weights that are used to determine the weighted sum of the identification factors.

15. The computer-implemented method of claim 13, further comprising:
- at each of the plurality of backup servers, periodically determining a total pre-fetch score by summing a pre-fetch score of each of the plurality of backup servers, wherein the pre-fetch score of each of the plurality of backup servers comprises the historical client latency, the scheduled backup server workload, and a failure percentage; and
- in response to determining that the total pre-fetch score does not exceed a maximum threshold, pre-fetching metadata on a backup server of the plurality of backup servers having a lowest pre-fetch score from the pre-fetch score of each of the plurality of backup servers.

16. The computer-implemented method of claim 13, wherein the metadata is pre-fetched from a metadata repository to metadata cache.

17. The computer-implemented method of claim 13, wherein the second backup server provides a client with a list of backup severs for use for future requests.

18. The computer-implemented method of claim 13, wherein the plurality of backup servers are nodes in a cloud infrastructure that includes a metadata cache for each of the plurality of backup servers, backup data storage for each of the plurality of backup servers, metadata repositories shared by each of the plurality of backup servers, and common storage shared by each of the plurality of backup servers.

* * * * *